(12) United States Patent
Meekins et al.

(10) Patent No.: US 8,807,478 B2
(45) Date of Patent: *Aug. 19, 2014

(54) AMPHIBIOUS AIRCRAFT

(71) Applicant: Leader Industries, Inc., Norfolk, VA (US)

(72) Inventors: John A. Meekins, Virginia Beach, CA (US); William Husa, Snohomish, WA (US)

(73) Assignee: Leader Industries, Inc., Norfolk, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,874

(22) Filed: Nov. 2, 2012

(65) Prior Publication Data

US 2014/0048647 A1      Feb. 20, 2014

Related U.S. Application Data

(60) Continuation of application No. 13/589,620, filed on Aug. 20, 2012, now Pat. No. 8,430,356, which is a division of application No. 12/756,282, filed on Apr. 8, 2010, now Pat. No. 8,272,596.

(51) Int. Cl.
*B64C 25/54* (2006.01)
*B64C 35/00* (2006.01)

(52) U.S. Cl.
USPC ............................ 244/101; 244/105; 244/108

(58) Field of Classification Search
USPC ............................ 244/101, 108, 105, 106, 2
See application file for complete search history.

(56) References Cited

U.S. PATENT DOCUMENTS

| | | | |
|---|---|---|---|
| 1,512,912 A | 10/1924 | Driggs |
| 1,778,906 A | 10/1929 | Monjouste |
| 1,794,474 A | 3/1931 | Von Miller |
| 1,812,265 A | 6/1931 | Hone |
| 1,815,341 A | 7/1931 | Zaharoff |
| 1,865,749 A | 7/1932 | Fleet |
| 1,885,392 A | 11/1932 | Tuten |
| 1,927,352 A | 9/1933 | Tetlow |

(Continued)

FOREIGN PATENT DOCUMENTS

FR       2660279       10/1991

OTHER PUBLICATIONS http://www.zenithair.com/zodiac/xl/bldrpics/amph6.jpg (Mar. 28, 2002) (p. 1).

(Continued)

*Primary Examiner* — Philip J Bonzell
(74) *Attorney, Agent, or Firm* — Kilpatrick Townsend & Stockton LLP

(57) ABSTRACT

Described are aircraft with at least one fuselage, a wing, and at least one float coupled to the wing. As examples, each float may include a step that is located forward of or at an intersection of a bottom surface and a line that extends from an aircraft aft-most center of gravity at an angle of less than ten degrees rearward from a vertical direction. As further examples, each float may include a forward portion located forward of the step, the forward portion including a ski surface that is planar in a left to right horizontal direction, and an aft portion that is located rearward of the step.

21 Claims, 6 Drawing Sheets

(56) References Cited

U.S. PATENT DOCUMENTS

| | | | |
|---|---|---|---|
| 2,003,975 | A | 6/1935 | Rand |
| 2,053,093 | A | 9/1936 | Luburg |
| 2,068,618 | A | 1/1937 | Wilford |
| D136,794 | S | 12/1943 | Gazda |
| D138,102 | S | 6/1944 | Kelly |
| D144,122 | S | 3/1946 | MacKusick et al. |
| D144,936 | S | 6/1946 | Schmued |
| D144,937 | S | 6/1946 | Schmued |
| D144,938 | S | 6/1946 | Schmued |
| 2,557,962 | A | 6/1951 | Greene |
| 2,656,136 | A | 10/1953 | Martin |
| 2,673,698 | A | 3/1954 | Eriksson |
| 2,913,196 | A | 11/1959 | Cox, Jr. |
| 2,964,271 | A | 12/1960 | Strawn |
| 3,029,042 | A | 4/1962 | Martin |
| 3,168,067 | A | 2/1965 | Graig |
| 3,329,376 | A | 7/1967 | Sullivan |
| 3,599,903 | A | 8/1971 | Handler |
| 3,627,235 | A | 12/1971 | Lippisch |
| 3,737,121 | A | 6/1973 | Jones |
| 3,738,598 | A | 6/1973 | Larkin |
| 3,790,109 | A | 2/1974 | Fischer |
| 3,830,448 | A | 8/1974 | Lippisch |
| 3,884,432 | A | 5/1975 | Blanchard, Jr. et al. |
| 4,351,500 | A | 9/1982 | Golze |
| 4,579,297 | A | 4/1986 | Ayoola |
| 4,848,702 | A | 7/1989 | Riggins |
| 4,865,275 | A | 9/1989 | Thompson |
| 4,899,954 | A | 2/1990 | Pruszenski, Jr. |
| D316,845 | S | 5/1991 | Slanker et al. |
| 5,071,088 | A | 12/1991 | Betts |
| 5,242,132 | A | 9/1993 | Wukowitz |
| 5,273,238 | A | 12/1993 | Sato |
| 5,277,383 | A | 1/1994 | Tormakhov et al. |
| 5,357,894 | A | 10/1994 | Jacobson |
| 5,415,365 | A | 5/1995 | Ratliff |
| 5,619,944 | A | 4/1997 | Baker |
| 5,758,844 | A | 6/1998 | Cummings |
| 5,850,990 | A | 12/1998 | Gevers |
| 6,113,028 | A | 9/2000 | Lohse et al. |
| 6,318,670 | B1 | 11/2001 | Center |
| 6,592,073 | B1 | 7/2003 | Meekins |
| D533,604 | S | 12/2006 | Butler et al. |
| 7,252,264 | B2 | 8/2007 | Nattinger |
| 7,334,756 | B2 | 2/2008 | Martirosov |
| 8,272,596 | B2 | 9/2012 | Husa et al. |
| 8,430,355 | B2 | 4/2013 | Meekins et al. |
| 8,430,356 | B2 | 4/2013 | Meekins et al. |
| 2001/0011691 | A1 | 8/2001 | Provost |
| 2002/0003190 | A1 | 1/2002 | Sankrithi et al. |
| 2006/0145000 | A1 | 7/2006 | Hensley |
| 2006/0284010 | A1 | 12/2006 | Meekins |
| 2007/0272795 | A1 | 11/2007 | Ellnor |
| 2011/0248118 | A1 | 10/2011 | Meekins et al. |
| 2013/0026290 | A1 | 1/2013 | Meekins et al. |
| 2013/0032666 | A1 | 2/2013 | Meekins et al. |

OTHER PUBLICATIONS

Avid Aircraft, Inc. Catalina http://www.airsport.com/kits/kcatalna.htm (Mar. 28, 2002) (p. 1).
B26 Marauder http://b26marauder.com (Jun. 27, 2002) (pp. 1-2).
Thurston, David, "Design For Flying, Second Edition," 1 page containing Copyright information, 4 pages containing Contents.
Centaur Fly the Wave http://www.centaurseaplane.com/docs/home/htm (Mar. 18, 2002) (p. 1).
Cessna.com http://caravanamphib.Cessna.com (Apr. 3, 2002) (p. 1).
Coot Amphibian http://coot-a.freeyellow.com (Mar. 28, 2002) (p. 1).
F82G Twin Mustang 1/32 Model (twin fuselage P51) http://www.historicaviation,.com/product_info.po;jsessionid=1NDInHje8IVsQWXimXRix( . . . (Jun. 27, 2002) (p. 1).
Fairchild C119 http:/www.oldprops.f9.co.uk/C119.htm (Jun. 27, 2002) (pp. 1-4).
Happiness is a Wet Bottom, Aventura II Amphibian Experimental Homebuilt Aircraft http://members.aol.com/_ht_a/cbrxxdrv?Aventura.html?mtbrand=AOL_US (Apr. 3, 2002) (p. 1).
Kenmore Air—Seaplanes http://www.kenmoreair.com/seaplanes.html (Mar. 28, 2002) (p. 2).
Lake http://www.amphib.com/citylk.htm (Mar. 28, 2002) (p. 1).
Oshkosh 2001 http://www.therispins.com/pictures_from_Oshkosh_2001.htm (Mar. 28, 2002) (p. 2).
Osprey II Amphibian Info http://www.ospreycraft.com/prod02.htm (Mar. 28, 2002) (p. 1).
P-38 Lightning Online The Fork-Tailed Devil http://p-38online.com (Apr. 2, 2002) (p. 1).
P-61 Black Widow http://www.maam.org/p61art/p61art1.html (Jun. 27, 2002) (pp. 1-2).
Piper-Sterling Amphibian 4 place (Experimental) http:/www.aircraftbrowser.com/Piper-Sterling%20Amphibian%204%20place%20(Experimen . . . (Mar. 28, 2002) (p. 1).
Quad City Ultralight Aircraft Corp. Home of the Challenger http://www.quadcitychallenger.com (Apr. 3, 2002) (pp. 1-2).
Seafire TA 16 http://www/seafireta16.com (Mar. 28, 2002) (p. 1).
Seafire TA 16 http://www.seafireta16.com/products.htm (Apr. 3, 2002) (p. 1).
Yenne, Bill, et al. "Seaplanes of the World A Timeless Collection from Aviation's Golden Age", 2000, Barnes & Noble by arrangement with O.G. Publishing, Inc. (pp. 1-176).
Seastar AAC Amphibian Airplanes of Canada Ltd. http://www.seastaramphibian.com/gallery.htm (Mar. 28, 2002) (p. 1).
SeaStar Amphibious Airplane http://www.seastarplane.com (Mar. 28, 2002) (p. 1).
Seattle Seaplanes Flight Instruction http://www.seattleseaplanes.com/pages/Instruction.html (Mar. 28, 2002) (p. 1).
Seawind The World's Fastest and Best Amphibian http://www.seawindsna.com (Mar. 6, 2002) (p. 1).
The Glass Goose by Quikkit http://exp-aircraft.com/aircraft/quikkit/quikkit.html (Mar. 28, 2002) (p. 1).
Ultravia Aero, Inc. Pelican Club VS http://www.airsport.com/kits/kpelican.htm (Mar. 28, 2002) (p. 1).

AMPHIBIOUS AIRCRAFT

CROSS-REFERENCE TO RELATED APPLICATIONS

This is a continuation application of U.S. patent application Ser. No. 13/589,620, filed Aug. 20, 2012, which is a divisional application of U.S. patent application Ser. No. 12/756,282, filed Apr. 8, 2010, now issued as U.S. Pat. No. 8,272,596, the contents of both of which are incorporated in full by reference.

FIELD OF THE INVENTION

The invention relates to amphibious aircraft, and more particularly to amphibious aircraft having twin stepped floats that enhance performance both on the water and in the air.

BACKGROUND

Seaplanes are aircraft that are capable of taking off and landing upon water. Seaplanes may fall into two broad categories. In the first category, the lower part of the fuselage is shaped like a boat hull and which, at rest and at low speeds, floats on the surface like a boat. The second category consists of conventional land planes that are mounted on floats in place of, or in addition to, conventional landing gear, which are often referred to as float planes.

A seaplane that is also equipped with wheels is called an amphibian: an airplane capable of operating on land or water. An amphibian aircraft is designed to operate on unimproved runways and water and is an effective form of transportation into remote and undeveloped areas. Amphibians typically include a pair of floats with landing gear that can be retractable or nonretractable. For operating on land, amphibians may include a conventional landing gear design having a pair of main wheels and a tailwheel. This type of landing gear may be preferable for amphibians operating in remote areas because this type of landing gear can be better for unimproved field operation. Other types of amphibians utilize a tricycle landing gear design, also known as a "nosewheel" type of landing gear, which includes a pair of main wheels located on each side of a centerline behind the plane's center of gravity, with a nosewheel mounted on centerline forward.

For operating on water, float planes and amphibians typically utilize a float shape that stabilizes the aircraft in water, yet does not significantly impede the aircraft's performance in the air. Earlier float designs tended to rely more heavily on displacement than planing at higher speeds, thus to some extent impeding takeoff ability. One answer to this problem included providing a step so that at higher speed on the water, the wetted surface of the float was lower, and more forward. A conventional float shape is often described as a planing tail because it only has one step with a forebody ahead of the step and an afterbody behind the step and a V-shaped bottom surface to reduce water impact loads. Many conventional float designs place the step at approximately the same position as one would mount the main landing gear.

The location of the main landing gear for land-based aircraft, and consequently the conventional location of the step for aircrafts, is determined on factors that include location of the most aft center of gravity ("c.g."). For example, in the tricycle landing gear design, the landing gear main wheels are positioned behind the c.g. so that at relevant portions of the aircraft performance envelope, the center of gravity remains ahead of the main wheel contact point. Additionally, the main gear can be disposed at a trailing angle relative to the ground to give the aircraft inherent dynamic stability on the ground. In some cases, the main gear can be located at a trailing angle measured from a vertical line passing through the c.g. or near the c.g. This angle can range from 5° to 7° or more for some designs, for example, but may be higher or lower depending on a number of factors.

For amphibians with rectractable landing gear, the location of the step at approximately the same position as one would mount the main landing gear causes the main landing gear to be located further aft than the desired location described above. A further aft main landing gear position may result in longer takeoff runs or more abrupt takeoffs on land because the further aft position of the landing gear makes it more difficult to rotate the aircraft on takeoff. The greater difficulty in maneuverability is due in part to the longer distance between the main landing gear and the c.g., which results in a higher moment needed for rotation, in turn requiring more elevator deflection, more airspeed, or both, before the aircraft can be rotated to the proper angle of attack for lift-off.

Locating the step in the conventional location for the main wheels also introduces negative handling characteristics on water that require constant pilot input after touchdown because the float plane or amphibian is balancing on the floats until the floats transition from planing mode to displacement mode. In effect, handling a float plane or amphibian with a conventionally located step after touchdown can be described as analogous to balancing a broomstick on one's fingertips.

In some instances, seaplanes may also land and takeoff from surfaces such as snow, wet grass, marshy areas or other unimproved surfaces. In an emergency, these planes may be required to land and takeoff on soil or even pavement. In these situations, the conventional V-shaped bottom has a tendency to dig into the surface, impeding the ability of the aircraft to separate from the surface on which it is moving.

Typically, smaller seaplanes include a propeller power plant that is either forward- or aft-mounted. Forward-mounted propeller power plants, as known as tractor propellers, have the engine and propeller mounted at the front of the aircraft where the thrust draws or pulls the airplane. Tractor propellers in seaplanes can send excessive spray over the cockpit and are more susceptible to bird collisions in areas that present such a hazard.

Aft-mounted propeller power plants, as known as pusher propellers, feature propellers mounted behind the engine where the thrust produced by the propeller pushes the airplane forward. Pusher propellers can offer better visibility and less drag than tractor configurations, but tend to reduce wing lift at the higher angles of attack associated with short-field takeoff, as well as during abrupt power corrections in the approach or landing configuration. Typically, maintenance concerns have favored tractor propellers because pusher propellers are subject to damage from turbulent flow, materials coming from the cabin, loose hardware left inside the cowling, and debris thrown up by the landing gear.

In either configuration, open-design propellers create a substantial amount of noise and can be less efficient than propellers rotating within a shroud, which reduce tip effect loss.

Accordingly, there is a need for a seaplane or amphibious design that improves the location of the step and landing gear for improved handling during takeoff and landing on both land and water. There is also a need to provide a float shape that enables efficient separation of the aircraft from the water and allows the aircraft greater flexibility to takeoff and land on a variety of surfaces. Moreover, there is a need for a seaplane or amphibious aircraft design featuring a shrouded pusher propeller power plant design with improved visibility, less drag, improved thrust performance at static and low speeds for short-field takeoffs, reduced likelihood of damage during operation, and quieter operation.

SUMMARY

Embodiments of the present invention include an aircraft with at least one fuselage, a main wing, a propeller power plant coupled to the at least one fuselage, a shroud surrounding the propeller, and at least two floats coupled to the wings. In some embodiments, each float may further comprise a step positioned forward of a line that is at least 5 degrees rearward of a vertical line passing through a most aft or other desired center of gravity. In other embodiments, the step is positioned between the vertical line passing through the most aft empty weight center of gravity and the line that is angled at least 5 degrees rearward of the vertical line. In yet other embodiments, the step is positioned on the vertical line passing through the most aft empty weight center of gravity.

In some embodiments, each float comprises a forward portion that is positioned forward of the step, wherein a ski surface forms part of the bottom of the forward portion, and an aft portion that is positioned aft of the step, wherein the aft portion of each float is wetted at taxiing speed so that the aircraft operates has the feel on water more similar to how a "tail dragger" or aircraft with conventional gear design operates on land. A rudder may be coupled to the aft portion to enable steering while taxiing on the water. Each float may also include a retractable wheel and landing gear, wherein the wheel is preferably located on a line that is at least 5 degrees rearward of a vertical line passing through the most aft empty weight center of gravity.

The aircraft may take off from water by first operating in a taxiing regime, with nose-high trim when taxiing, accelerating the aircraft above taxiing speed to transition the aircraft to a planing regime on the forward portion of each float so that the aft portion is no longer wetted, reaching takeoff speed, and causing the aircraft to fly or rotate off the water as desired.

The aircraft may land on water by decelerating the aircraft to desired landing speed, configuring the flaps and the aircraft otherwise for landing, contacting the forward portion of each float with the water surface, and allowing the aft portion of each float to drop and become wetted, whereupon the floats operate in a displacement mode for taxiing, without undue time spent having to "fly the plane on the water" that would otherwise be necessitated by conventional float designs.

DETAILED DESCRIPTION

Figure 1:
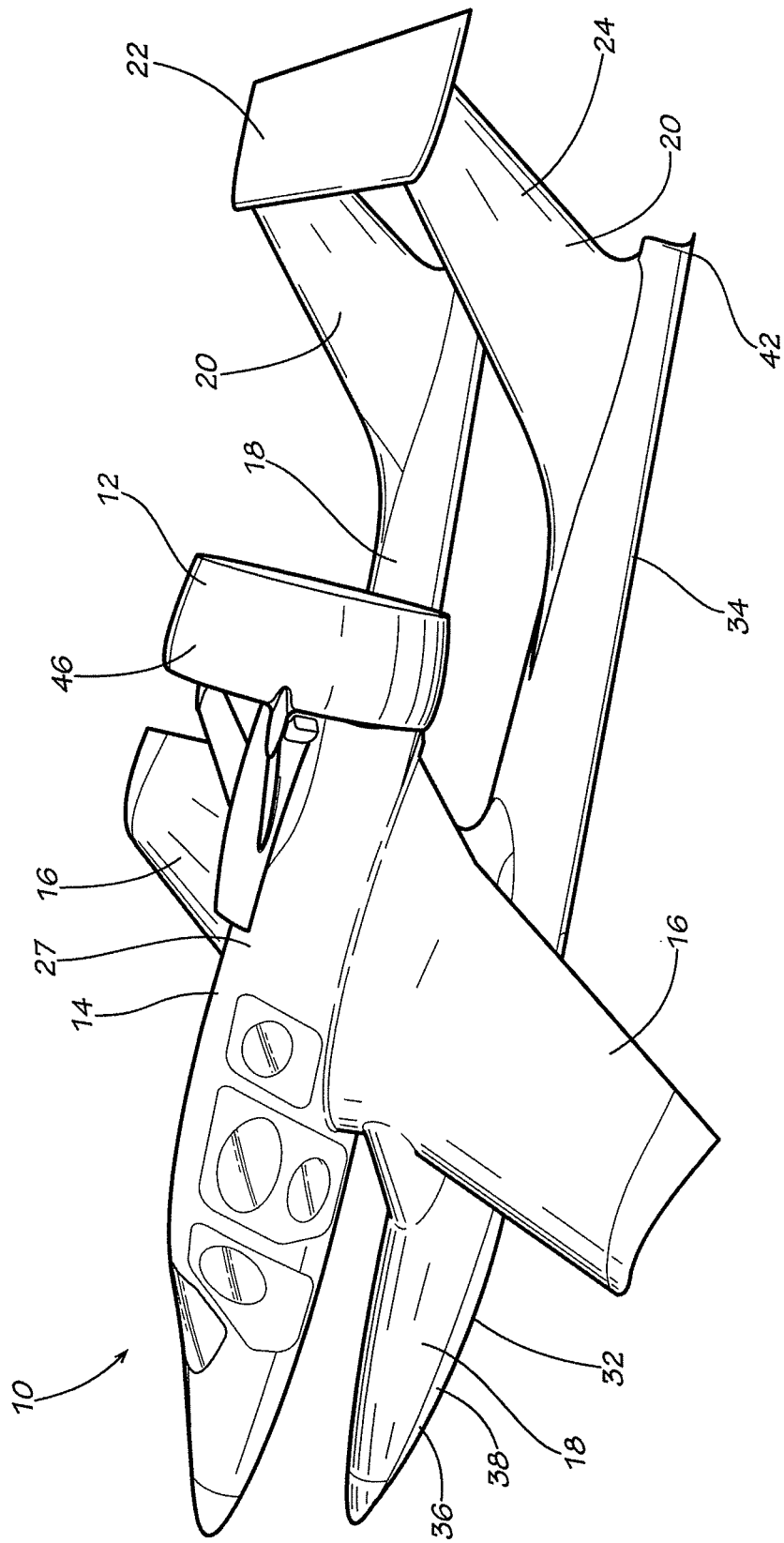
FIG. 1 is a perspective view of an amphibious aircraft according to one embodiment of the present invention.
Figure 2:
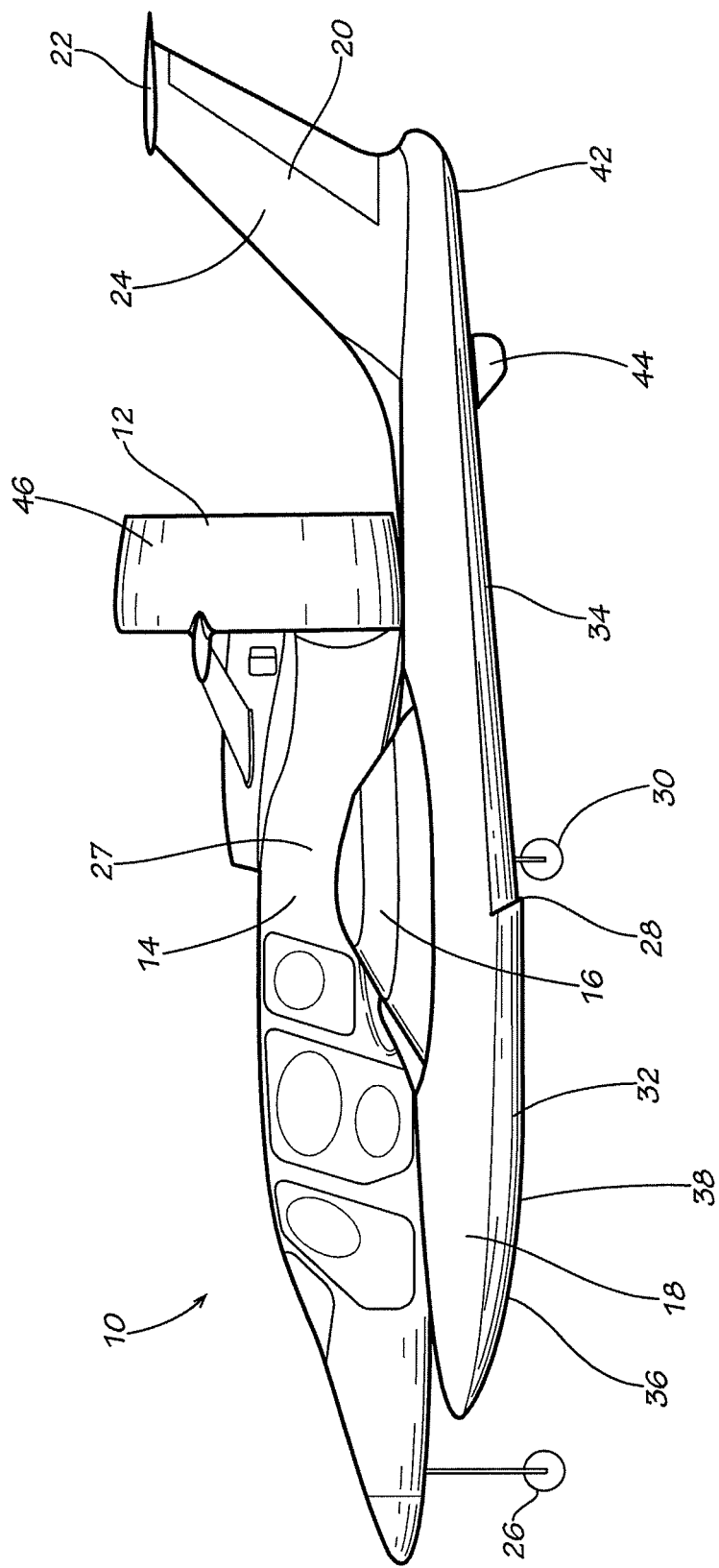
FIG. 2 is a side view of the amphibious aircraft of FIG. 1.

FIGS. 1-6 illustrate an amphibious aircraft 10 according to one embodiment of the invention. In this embodiment, the aircraft 10 features a power plant 12 mounted to an aft portion of fuselage 14. The fuselage 14 includes a wing 16. A float 18 is cantilevered from the wing 16. A vertical fin 20 is coupled to the aft end of each float 18. A horizontal stabilizer 22 is coupled to the vertical fins 20, preferably but not necessarily near the top of the fins 20, to complete a tail portion 24. A nosewheel 26 is coupled to the front of the fuselage 14.

In some embodiments, the fuselage 14 is configured for appropriate hydrodynamic effects, both statically and dynamically during all phases of taxiing, takeoff, and landing. The fuselage 14 may feature any desired shape, length, width, and height to accomplish the result of appropriate aerodynamic and hydrodynamic performance for a general aviation class amphibious aircraft with favorable stability, airspeed, range, and maneuverability characteristics. The fuselage 14 may be assembled in a stress skin monocoque, semimonocoque, or longitudinal member design, or a combination of any or all of these designs. A skin 27 is fastened to the design and carries primarily the shear load, tension, and bending stresses. The fuselage 14 may be formed of any suitable material including but not limited to aluminum, aluminum alloys, other metallic materials, composite materials, or other similar materials. The horizontal stabilizer 22 may be included as shown in FIGS. 1-4. The horizontal stabilizer 22 generally affects pitch performance during taxiing, takeoff, and landing on the water.

The wing 16 can formed of a stress skin monocoque, semi-monocoque, or conventional longitudinal member design, or a combination of any or all of these designs. A monocoque construction can use corrugations extending along the length of the wing 16 for structural integrity. In cross section, the corrugations provide advantages of a warren truss arrangement, which provides stability and stiffness for the wing 16. The wing 16 may be formed of any suitable material including but not limited to aluminum, aluminum alloys, other metallic materials, composite materials, or other similar materials.

FIGS. 1-6 illustrate one embodiment of the float 18, which includes a step 28 and a main wheel 30. The float 18 may be formed of any suitable material including but not limited to stress skin monocoque, wood, foam, plastic, composites, fiberglass, or other desired materials. The floats 18 are oriented substantially parallel to chords of the wing 16. As a result, the floats 18 present minimal surface area to the airflow, thus reducing drag and increasing cruise speed of the aircraft 10.

The step 28 divides the float 18 into a forward portion 32 and an aft portion 34. In some embodiments, the forward portion 32 is shaped to incorporate a ski surface 36 into a bottom 38 of the float 18. In these embodiments, the ski surface 36 results in a float 18 having a lower surface that is generally planar. The ski surface 36 provides the float 18 with improved planing capabilities, allowing earlier transition to the planing mode and thus increasing acceleration and decreasing the time spent on the surface during take-off. In some embodiments, the incorporation of the ski surface 36 significantly enhances take-off performance compared to that of a more conventionally arranged float shape. For example, the incorporation of the ski surface 36 may provide takeoff speeds of substantially 52 knots, more preferably between 52 and 56 knots, which is substantially higher than takeoff speeds for conventionally located steps, where conventional takeoff speeds range from 35 to 39 knots. The use of the ski surface 36 may also allow the aircraft 10 to takeoff from distances less than 1000 feet. Due to its planar configuration, the ski surface 36 enables lower surface contact pressure, resulting in less friction or tendency of the float 18 to become entrenched in the landing surface, particularly when the landing surface is snow, wet grass, or marginal environments such as marshy areas or when landing in soil or pavement during an emergency.

Figure 3:
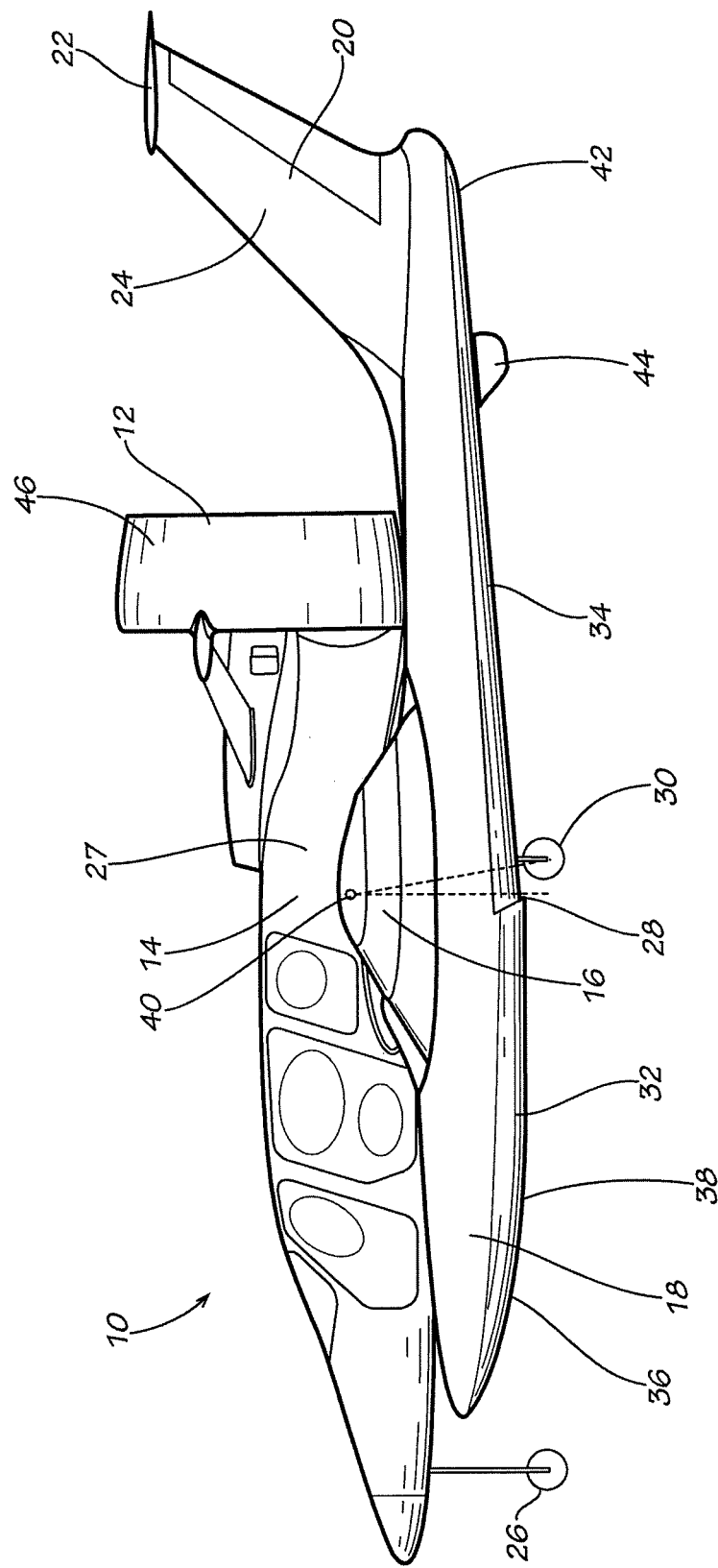
FIG. 3 is another side view of the amphibious aircraft of FIG. 1.
Figure 4:
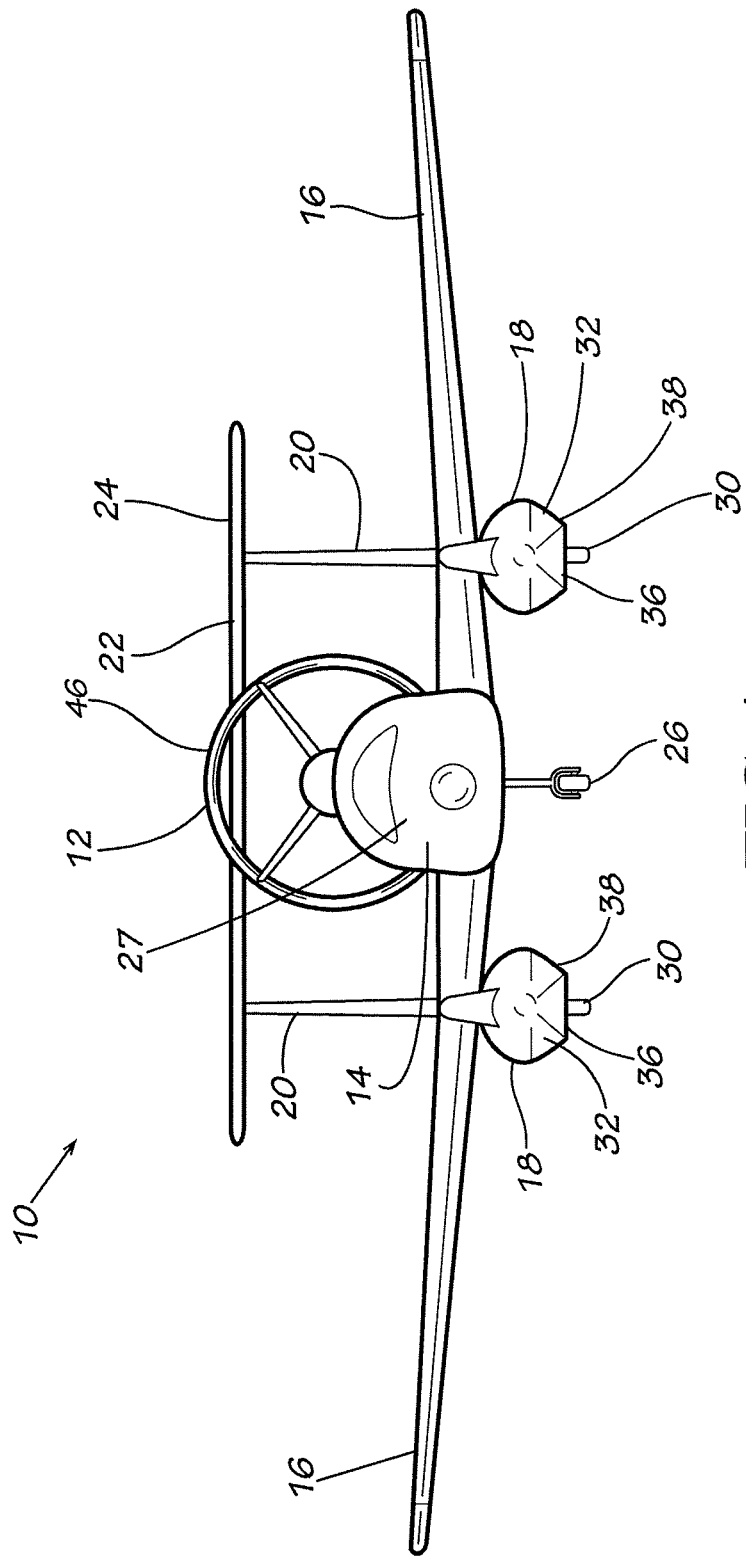
FIG. 4 is a front elevation view of the amphibious aircraft of FIG. 1.
Figure 5:
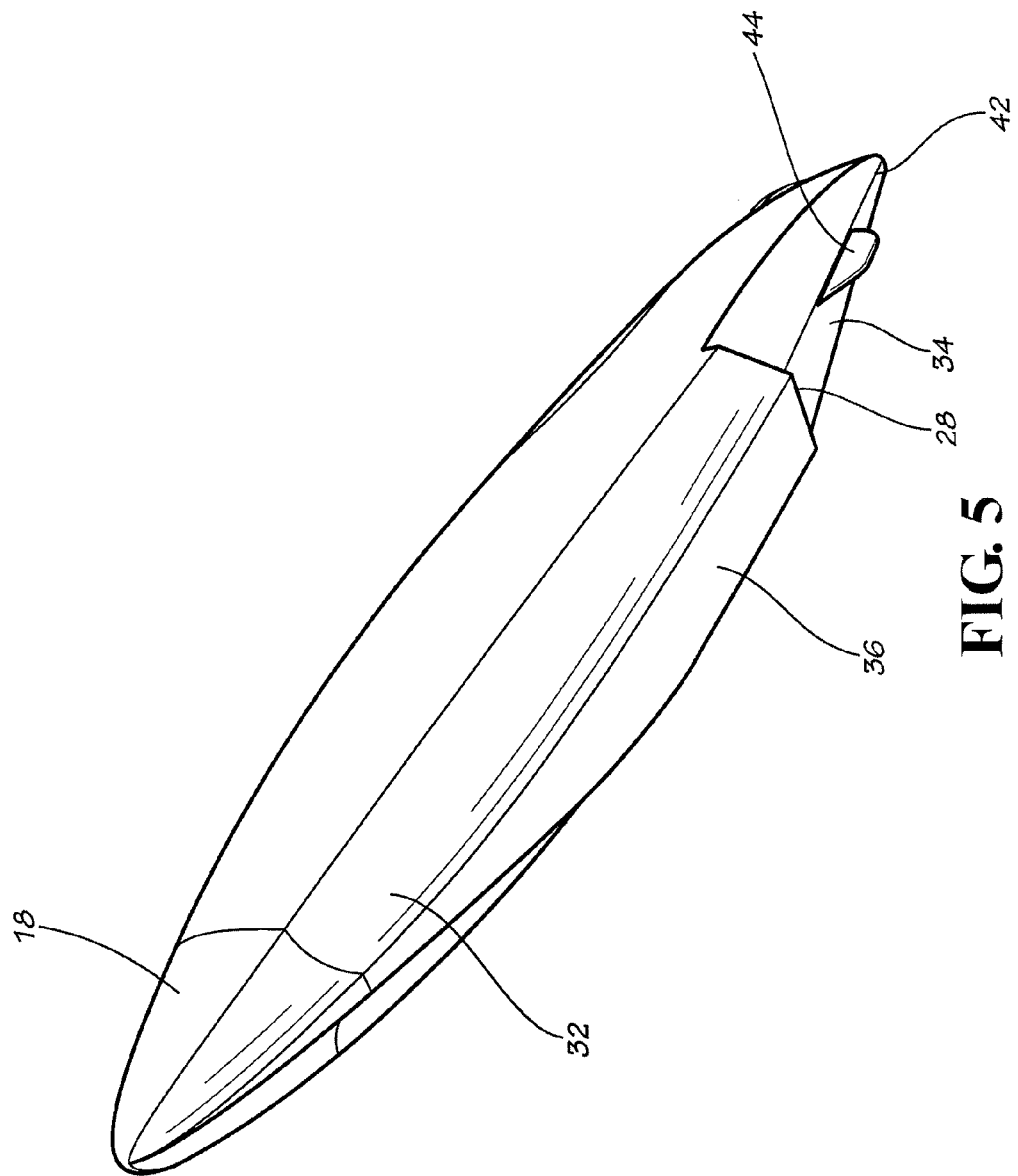
FIG. 5 is a perspective view of the float of the amphibious aircraft of FIG. 1 with the wheel retracted.
Figure 6:
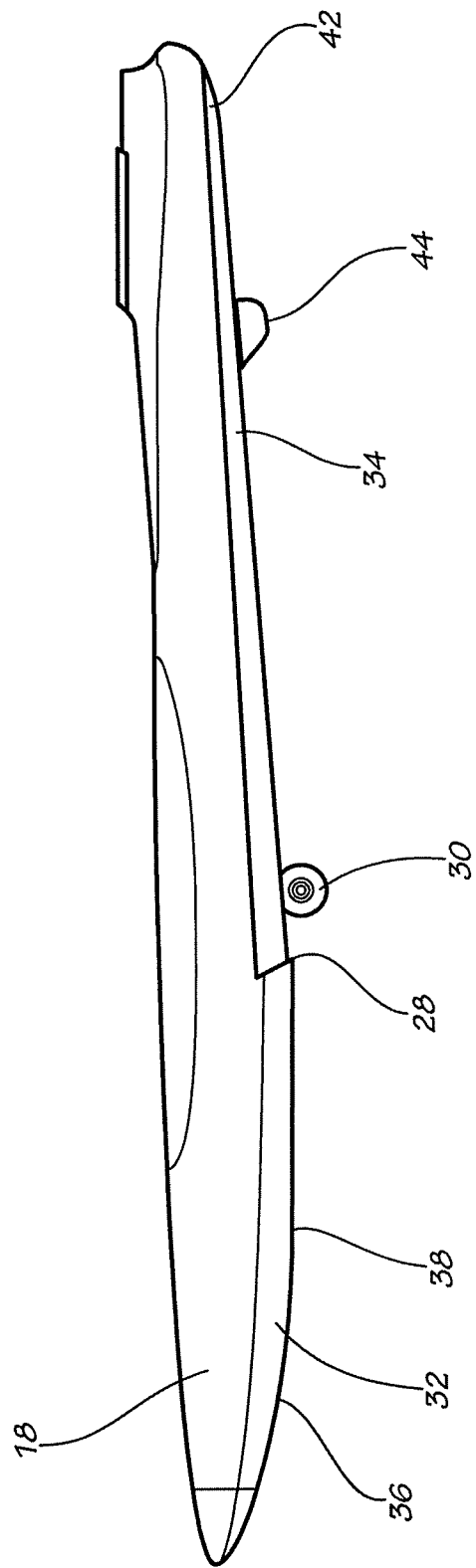
FIG. 6 is a side view of the float of the amphibious aircraft of FIG. 1 with the wheel extended.

In some embodiments, as shown in FIGS. 2, 3, 5, and 6, the step 28 creates a sudden break or discontinuity in the longitudinal lines extending from the forward portion 32 at the approximate point around which the aircraft 10 rotates into a lift-off attitude. The step 28 allows water to flow freely behind the step, resulting in minimum surface friction to allow the aircraft 10 to break away from the water's surface. In some embodiments, the step 28 is located slightly forward of a conventional step location, where the conventional location is rearward 6° to 10° off a vertical c.g. location 40. The c.g. location 40 may have any appropriate location on the aircraft 10 based on the various components and loading parameters associated with the aircraft 10. In one embodiment, as illustrated in FIG. 3, the step 28 is located on a vertical line passing through the c.g location 40. In other embodiments, the step 28 is located between a vertical line passing through the c.g. location 40 and the conventional location.

In the embodiments where the step 28 is located forward of its conventional location, the aft portion 34 of the float 18 is in the water at taxiing speeds, whereupon the floats 18 are acting in a displacement mode, the aircraft has a nose up trim, and a pair of rudders 44 can be used to steer. The forward shift of the step 28 moves the float's resultant pressure vector slightly forward of the more conventional location. As a result, the aircraft's resultant force vector is similar to the configuration of a "tail dragger" land plane, where a tail dragger is a term used to describe a type of conventional landing gear for land planes where the main wheels are located on each side of the centerline ahead of the c.g., with a steerable tailwheel located under the tail. This type of landing gear is known for its ability to land "tail first." However, unlike the tail dragger land plane, which may incur momentum-caused handling issues, the water environment for the aircraft 10 will actually aid the handling and stability characteristics by providing a stabling and damping influence on an aft portion 42. Hence, the aircraft 10 operates as a "tail dragger" when the aft portions 34 are wetted. This configuration causes the aircraft 10 to sit in nose-high trim when taxiing, but allows a nearly ideal take-off attitude with little or no input from the pilot.

During take-off, as the aircraft 10 transitions toward take-off speed, the aircraft 10 begins to plane on the forward portion 32 of each float 18, so that the aft portion 34 of each float 18 is no longer wetted. The forward portion 32 of each float 18 acts as a hydroplane so that the aircraft 10 can be flown off the water straight and level. The aerodynamic center of the wing 16 and the horizontal stabilizer 22 lift the aft portions 34 off the water, so that the center of buoyancy shifts forward from aft of the c.g. to a more forward location, which is forward of the step 28. Because the aircraft 10 operates as a tail dragger during takeoff on water, the aircraft 10 can maintain a relatively stable angle of attack throughout its acceleration run, with only minimal input from the pilot required. Properly trimmed and configured, it is possible that the aircraft 10 will be able to accelerate and lift off the water with no pilot input, beyond moving the throttle to takeoff position.

In some embodiments, the forward location of the step 28 significantly enhances take-off performance compared to a more conventionally located step. For example, the forward location of the step 28 may allow takeoff speeds of substantially 52 knots, preferably between 52 and 56 knots, which is substantially higher than conventional takeoff speeds of 35 to 39 knots. The forward location of the step 28 may also allow the aircraft 10 to takeoff from distances less than 1000 feet.

When landing the aircraft 10, the same tail dragger-like float 18 configuration allows the tail portion 24 to settle into the water earlier and with less pilot input, accomplishing on-water stability that is not possible with a more conventional float design. In short, the pilot does not have to fly the plane on the water down to taxi speed as is the case for conventional float designs, thus reducing the potential for noseovers. The tendency to settle the tail portion 24 quickly is considered to be more stable and thus safer because of the shifted balance position. It is possible that the aircraft 10, with correct trim settings, will be able to land and transition to displacement mode with little or no pilot input.

When performing a takeoff or landing on land, the aircraft 10 operates like a land plane with tricycle gear because the main wheels 30 are located in the conventional location (i.e., not located aft of the preferred 6° to 10° off the vertical c.g. location). Therefore, handling of aircraft 10 on a hard runway is no different than any other tricycle configured plane. The similarity of runway characteristics allows for easier pilot transition from a conventional land aircraft to the aircraft 10.

To maneuver the aircraft 10 in the water, some embodiments include the rudder 44 that is positioned on the aft portion 34 behind the step 28, which is illustrated in FIGS. 2, 3, 5, and 6. When the aircraft 10 planes on the forward portion 32 of each float 18, the rudder 44 is removed from the water. Due to its placement behind the step 28, the rudder 44 does not create any drag and therefore does not require retraction during flight. In some embodiments, the rudder 44 is located approximately three-quarters of the distance between the step 28 and the aft end 42 of the float 18 in a direction toward the aft end 42. The rudder 44 may be formed of any appropriate material including but not limited to aluminum, carbon steel, stainless steel, other metallic materials, composite materials, or other similar materials. The tendency to quickly settle the tail portion 24 is considered to be more stable and thus safer because it allows the rudders 44 to function sooner than what might otherwise be possible with a conventional step location.

In some embodiments, as shown in FIGS. 1-4, the power plant 12 includes a reciprocating propeller/fan design. In some embodiments, the power plant 12 is an aft-mounted propeller power plant 12. However, the power plant 12 may be mounted in any suitable location and may be of any desired manufacture or design, including reciprocating or jet. The fan or propeller (in this document, both are included in the meaning of the term "propeller") may be constant speed or variable speed, controllable pitch or otherwise. One particular form of power plant design that is appropriate is a fanjet or jet engine with high bypass ratio. The aft-mounting location provides some protection to the power plant 12 from excessive spray during water landings and takeoffs.

In some embodiments, as shown in FIGS. 1-4, the power plant 12 is a propeller power plant wherein the propeller is surrounded by a shroud 46. The shroud 46 can substantially enhance efficiency and performance of the propeller, can make the propeller/power plant combination quieter, and can provide additional protection to prevent contact between the propeller power plant 12 and the water. The shroud 46 also protects the propeller power plant 12 from damage caused by objects that it would otherwise encounter.

The shroud 46 may be formed of any suitable material including aluminum, carbon steel, stainless steel, other metallic materials, composite materials, or other similar materials. The shroud 46 can either be wiped by the propeller or provide sufficient space for the propeller to rotate freely. In cross section, the shroud 46 may be any appropriate shape that reduces drag and gives appropriate performance characteristics, including but not limited to an airfoil with the high-pressure side facing outward, an airfoil with the high-pressure side facing inward, or any other appropriate shape.

At low airspeeds, the shrouded propeller power plant 12 increases the static and low speed thrust performance over an open propeller power plant of the same diameter. Thus, the static and low speed thrust is increased without any change in power or power plant diameter. The improved performance of the shrouded propeller power plant 12 reduces the required take-off distance and increasing climb rates. This increased power plant effectiveness continues through cruising speeds in excess of 200 knots.

The shroud 46 also reduces the amount of noise produced by the propeller power plant 12. As a result, the shrouded propeller power plant 12 produces a quieter operation as compared to open propeller power plant configurations. The aircraft 10 is therefore able to operate within more noise sensitive areas such as those with higher population densities or forms of environmental noise restrictions.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. An aircraft configured to take off and land on water, the aircraft including at least one fuselage and at least one wing connected to the fuselage, the aircraft including an aft-most center of gravity and at least one float, the float comprising:
   a float body that includes a bottom surface;
   a bottom surface forward portion located on the float body bottom surface, the bottom surface forward portion including a ski surface that is planar in a left-to-right horizontal direction;
   a bottom surface rearward portion located on the float body bottom surface, the bottom surface rearward portion including a rudder; and
   a bottom surface step located on the float body bottom surface and interposed between the bottom surface forward portion and the bottom surface rearward portion, the step including a point that is located forward of or at an intersection of the bottom surface and a line that extends from the aircraft aft-most center of gravity at an angle of less than ten degrees rearward from a vertical direction.

2. An aircraft according to claim 1, wherein the step includes a point that is located forward of or at the intersection of the bottom surface and a line that extends from the aircraft aft-most center of gravity at an angle greater than six and less than ten degrees rearward from the vertical direction.

3. An aircraft according to claim 1, wherein the step includes a point that is located forward of or at the intersection of the bottom surface and a line that extends from the aircraft aft-most center of gravity at an angle of five degrees rearward from the vertical direction.

4. An aircraft according to claim 1, wherein the at least one float includes a center of buoyancy on a line extending vertically from the aircraft aft-most center of gravity and rearward of the bottom surface step when the aircraft is at rest on the water.

5. An aircraft according to claim 1, wherein the at least one float includes a center of buoyancy that is located forward of the bottom surface step during takeoff of the aircraft.

6. An aircraft according to claim 1, wherein the at least one float is connected to the at least one wing.

7. An aircraft according to claim 1, wherein the aircraft includes two floats.

8. An aircraft according to claim 1, wherein the at least one float includes at least one landing gear.

9. An aircraft according to claim 8, wherein the at least one landing gear includes at least one wheel.

10. An aircraft according to claim 1, wherein the float body includes a nose and the ski surface includes a convergent portion wherein a pair of edges of the ski surface converge toward the nose of the float body.

11. An aircraft according to claim 10, wherein at least part of the bottom surface forward portion is concave in cross section.

12. An aircraft according to claim 11, wherein at least part of the bottom surface forward portion includes a pair of streamline surfaces that are concave in cross section adjacent the ski surface convergent portion.

13. An aircraft configured to take off and land on water, the aircraft including at least one fuselage and at least one wing connected to the fuselage, the aircraft including an aft-most center of gravity and at least one float, the float comprising:
    a float body that includes a bottom surface and a nose;
    a bottom surface forward portion located on the float body bottom surface, the bottom surface forward portion including:
       a ski surface that is planar in a left-to-right horizontal direction, wherein the ski surface includes a convergent portion toward the nose of the float body; and
       a pair of streamline surfaces that are concave in cross section adjacent the convergent portion of the ski surface;
    a bottom surface rearward portion located on the float body bottom surface, the bottom surface rearward portion including a rudder; and
    a bottom surface step located on the float body bottom surface and interposed between the bottom surface forward portion and the bottom surface rearward portion, the step including a point that is located forward of or at an intersection of the bottom surface and a line that extends from the aircraft aft-most center of gravity at an angle of less than ten degrees rearward from a vertical direction.

14. An aircraft according to claim 13, wherein the step includes a point that is located forward of or at the intersection of the bottom surface and a line that extends from the aircraft aft-most center of gravity at an angle greater than six and less than ten degrees rearward from the vertical direction.

15. An aircraft according to claim 13, wherein the step includes a point that is located forward of or at the intersection of the bottom surface and a line that extends from the aircraft aft-most center of gravity at an angle of five degrees rearward from the vertical direction.

16. An aircraft according to claim 13, wherein the at least one float includes a center of buoyancy on a line extending vertically from the aircraft aft-most center of gravity and rearward of the bottom surface step when the aircraft is at rest on the water.

17. An aircraft according to claim 13, wherein the at least one float includes a center of buoyancy that is located forward of the bottom surface step during takeoff of the aircraft.

18. An aircraft according to claim 13, wherein the at least one float is connected to the at least one wing.

19. An aircraft according to claim 13, wherein the aircraft includes two floats.

20. An aircraft according to claim 13, wherein the at least one float includes at least one landing gear.

21. An aircraft according to claim 20, wherein the at least one landing gear includes at least one wheel.

* * * * *